(12) United States Patent
Yamasaki et al.

(10) Patent No.: US 9,928,763 B2
(45) Date of Patent: Mar. 27, 2018

(54) GUIDE DISPLAY DEVICE AND GUIDE SYSTEM

(71) Applicant: Panasonic Intellectual Property Management Co., Ltd., Osaka (JP)

(72) Inventors: Shigeaki Yamasaki, Osaka (JP); Masaaki Ikehara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/450,319

(22) Filed: Mar. 6, 2017

(65) Prior Publication Data

US 2017/0263163 A1    Sep. 14, 2017

(30) Foreign Application Priority Data

Mar. 8, 2016  (JP) .................................. 2016-045055

(51) Int. Cl.
*G09F 13/04*    (2006.01)
*G09F 13/00*    (2006.01)
*F21V 23/04*    (2006.01)
*F21V 11/00*    (2015.01)
*H05B 37/02*    (2006.01)
*H04B 10/116*   (2013.01)

(52) U.S. Cl.
CPC .......... *G09F 13/0413* (2013.01); *F21V 11/00* (2013.01); *F21V 23/0407* (2013.01); *G09F 13/005* (2013.01); *H04B 10/116* (2013.01); *H05B 37/0227* (2013.01); *G09F 2013/0459* (2013.01)

(58) Field of Classification Search
CPC .............. G09F 13/0413; G09F 13/005; G09F 2013/0459; F21V 23/0407; F21V 11/00; H05B 37/0227; H04B 10/116
See application file for complete search history.

(56) References Cited

U.S. PATENT DOCUMENTS

| 6,559,865 B1 * | 5/2003 | Angwin ................. G01C 21/32 340/990 |
| 9,293,042 B1 * | 3/2016 | Wasserman ........ G06Q 30/0265 |
| 9,536,428 B1 * | 1/2017 | Wasserman ........ G06Q 30/0265 |
| 2014/0338237 A1 * | 11/2014 | Chu .......................... G09F 9/30 40/452 |

(Continued)

FOREIGN PATENT DOCUMENTS

| JP | 2005-236667 | 9/2005 |
| JP | 2006-319545 | 11/2006 |
| JP | 2009-130725 | 6/2009 |

(Continued)

*Primary Examiner* — Russell Frejd
(74) *Attorney, Agent, or Firm* — Renner Otto Boisselle & Sklar, LLP

(57) ABSTRACT

A guide display device which is installed in a predetermined direction includes: a first screen which is parallel to the predetermined direction; a first light source which illuminates the first screen; a cover which is provided above the first screen in the predetermined direction and projects in a direction crossing the first screen to block light from above the guide display device and cast a shadow upon an area of the guide display device; a second light source which illuminates the area on which the shadow is cast; and a controller which causes at least the second light source to perform optical communication.

13 Claims, 5 Drawing Sheets

(56) References Cited

U.S. PATENT DOCUMENTS

2015/0084838 A1* 3/2015 Chang .................. G06F 3/1454
                                                    345/2.1
2015/0244919 A1* 8/2015 Oshima ................ H04B 10/116
                                                    348/362

FOREIGN PATENT DOCUMENTS

| JP | 2011-061305 | 3/2011 |
| JP | 2012-055582 | 3/2012 |

* cited by examiner

| IDENTIFICATION INFORMATION | LOCATION INFORMATION (LATITUDE, LONGITUDE) |
|---|---|
| 111 | 34.6863, 135.5197 |
| 222 | 34.6912, 135.1830 |
| 333 | 34.6853, 135.8327 |
| ... | ... |

GUIDE DISPLAY DEVICE AND GUIDE SYSTEM

CROSS REFERENCE TO RELATED APPLICATION

This application claims the benefit of priority of Japanese Patent Application Number 2016-045055 filed on Mar. 8, 2016, the entire content of which is hereby incorporated by reference.

BACKGROUND

1. Technical Field

The present disclosure relates to a guide display device and a guide system including the guide display device.

2. Description of the Related Art

A guide display device has been proposed which transmits, through optical communication, identification information from a screen which displays a guide such as a map. The guide display device is an information board having an internal lighting system, for example, and causes a light source disposed on a back side of a screen to output light including identification information to transmit the identification information from the screen. The identification information is, for example, information indicating an installation location of the guide display device. A user captures the screen with a mobile terminal etc. to receive the identification information, and checks a present location (the installation location of the guide display device) with the mobile terminal. Moreover, the user inputs a destination to the mobile terminal to receive a guide service which allows the user to check a route from the present location to the destination with the mobile terminal. Patent Literature (PTL) 1 (Japanese Unexamined Patent Application Publication No. 2012-055582) discloses a technique relating to such a guide display device.

SUMMARY

When, for example, the above guide display device is installed outdoors, the screen is sometimes illuminated with strong light such as sunlight. In this case, the mobile terminal sometimes cannot receive the above guide service because the mobile terminal cannot correctly receive the identification information transmitted from the screen due to the influence of the sunlight.

In view of this, an object of the present disclosure is to provide a guide display device and a guide system which make it possible to correctly perform optical communication.

The guide display device according to one aspect of the present disclosure is a guide display device which is installed in a predetermined direction and includes: a first screen which is parallel to the predetermined direction; a first light source which illuminates the first screen; a cover which is provided above the first screen in the predetermined direction and projects in a direction crossing the first screen to block light from above the guide display device and cast a shadow upon an area of the guide display device; a second light source which illuminates the area on which the shadow is cast; and a controller which causes at least the second light source to perform optical communication.

A guide system according to one aspect of the present disclosure includes: the guide display device described above; a server which stores present location information in which identification information transmitted by either one of the first light source and the second light source through the optical communication is associated in advance with location information of the guide display device; and a mobile terminal which communicates with the server, wherein the mobile terminal transmits, to the server, information indicating a destination, and the identification information obtained by a capturer included in the mobile terminal, and the server checks the identification information transmitted by the mobile terminal against the present location information, generates route information indicating a route from a location indicated by location information corresponding to the identification information to a location indicated by the information indicating the destination and transmitted by the mobile terminal, and transmits the route information to the mobile terminal.

The guide display device and the guide system according to the aspects of the present disclosure make it possible to correctly perform optical communication.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

The following describes in detail exemplary embodiments of the present disclosure, with reference to the drawings. The exemplary embodiments described below each show a specific example. Therefore, numerical values, shapes, materials, structural components, the arrangement and connection of the structural components, steps, the order of the steps, etc. shown in the following exemplary embodiments are mere examples, and are not intended to limit the present disclosure. Accordingly, among the structural components in the following exemplary embodiments, structural components not recited in any one of the independent claims which indicate the broadest concepts are described as freely-selected structural components.

The respective figures are schematic diagrams and are not necessarily precise illustrations. In addition, in the respective figures, identical structural components are given the same reference signs.

Embodiment

The following describes an embodiment with reference to FIGS. 1 to 8.

(External Appearance of Guide Display Device)

First, an external appearance of guide display device 10 will be described with reference to FIGS. 1 and 2.

Figure 1:
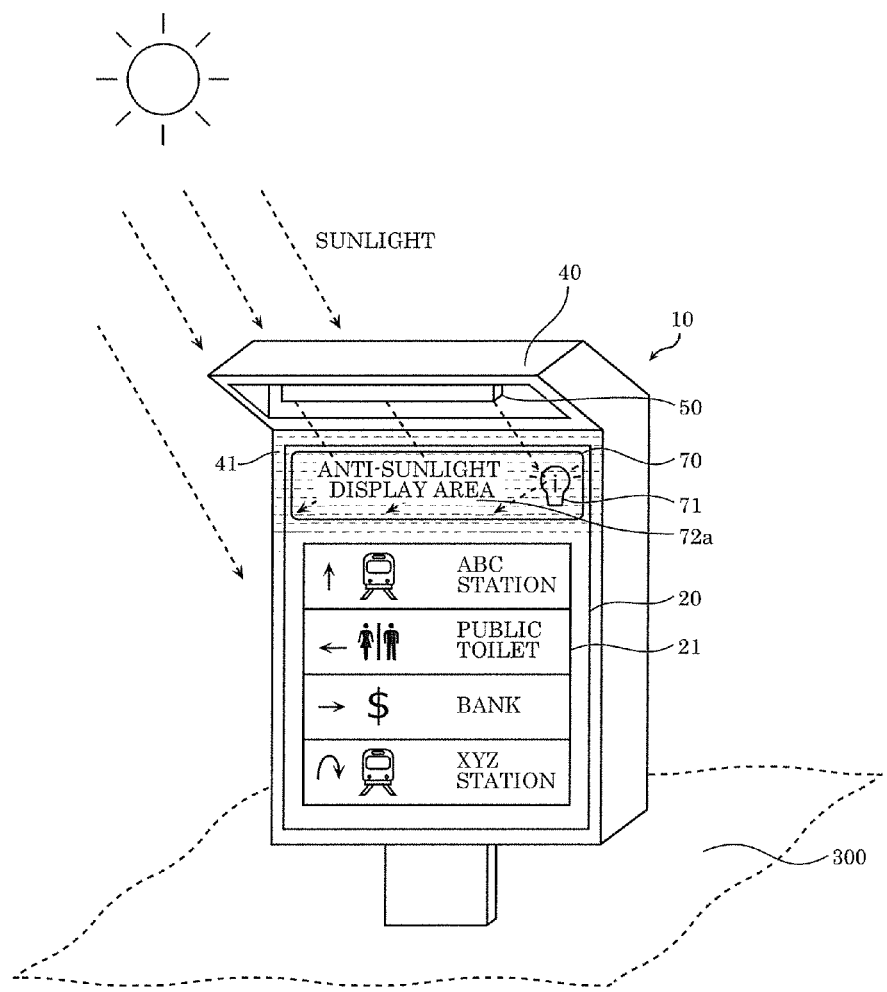
FIG. 1 is an external view illustrating an example of a guide display device according to an embodiment.

FIG. 1 is an external view illustrating an example of guide display device 10 according to the embodiment.

As illustrated in FIG. 1, guide display device 10 is installed in a predetermined direction, in a place receiving light such as an outdoor location receiving sunlight. Guide display device 10 is an information board (signboard) which displays guide information 21 such as routes or a map around the place where guide display device 10 is installed and an advertisement. The predetermined direction is, for example, a substantially vertical direction relative to installation surface 300. It is to be noted that although the predetermined direction is assumed to be the substantially vertical direction in the following, the predetermined direction may be a direction tilted at, for example, a 30 to 60 degrees angle relative to installation surface 300.

Figure 3:
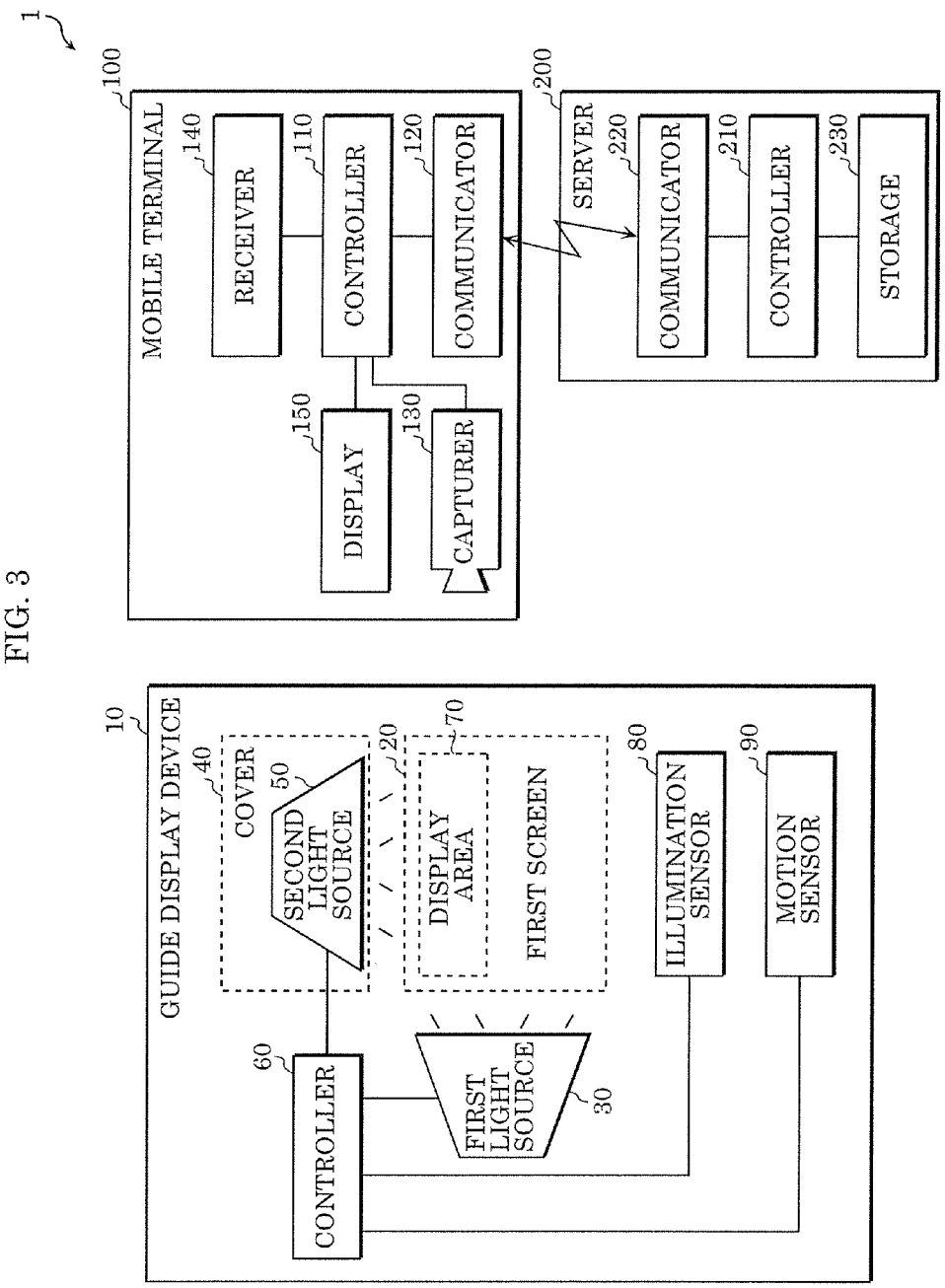
FIG. 3 is a block diagram illustrating an example of a guide system according to the embodiment.

Guide display device 10 includes first screen 20 on which guide information 21 is displayed. First screen 20 is, for example, a translucent glass plate or resin plate, and is illuminated by first light source 30 (FIG. 3). Guide display device 10 is an information board having an internal lighting system, for example. First light source 30 is not illustrated in FIG. 1 because first light source 30 is disposed on a back side of first screen 20. First light source 30 illuminates, for example, an entire surface of first screen 20 from the back side of first screen 20. First screen 20 is a surface parallel to the substantially vertical direction for people to view guide information 21 easily. Although FIG. 1 illustrates routes as guide information 21, guide information 21 may be information such as a map and an advertisement. In addition, guide information 21 may be an illustration drawn on first screen 20 in advance, an image projected by first light source 30, etc.

Guide display device 10 includes cover 40 which is provided above first screen 20 in the substantially vertical direction and projects in a direction crossing first screen 20. Specifically, cover 40 is provided above first screen 20 and projects therefrom in a substantially horizontal direction or to slope upward from the substantially horizontal direction or downward from the substantially horizontal direction. FIG. 1 shows cover 40 provided to slope upward from the substantially horizontal direction, above first screen 20 in the substantially vertical direction. Moreover, FIG. 1 shows area 41 (represented by dashed lines) on which a shadow of cover 40 blocking light (sunlight) from above guide display device 10 is cast. Guide display device 10 also includes second light source 50. Second light source 50 is attached to the bottom surface of cover 40, for example. Specifically, cover 40 has a recess on a side of the bottom surface, and second light source 50 is attached in the recess. Second light source 50 sets an illumination direction to area 41 to illuminate area 41 below cover 40. It is to be noted that second light source 50 may illuminate an area other than area 41. In addition, second light source 50 may be attached to the tip of an arm extending from cover 40. In this regard, however, second light source 50 is attached to illuminate area 41 below cover 40.

First screen 20 includes display area 70 overlapping with area 41 in an upper part of first screen 20. Area 41 and display area 70 overlap with each other. Thus, when second light source 50 illuminates area 40, second light source 50 also illuminates display area 70. Display area 70 has, for example, a light reflection function, and reflects light of second light source 50 from above first screen 20 in the substantially vertical direction, frontwards from display area 70.

Display area 70 displays mark 71 which indicates that identification information to be described later is obtainable, and predetermined information 72a. Predetermined information 72a is characters written in advance as, for example, "ANTI-SUNLIGHT DISPLAY AREA" in display area 70 using, for example, fluorescent paint. It is to be noted that predetermined information 72a may be an image projected by second light source 50. When the Sun is out, mark 71 may be in a location on which a shadow of cover 40 blocking the sunlight in any time period is cast. That is to say, an area other than mark 71 in display area 70 may be directly illuminated with the sunlight without cover 40 blocking the sunlight, depending on a time period. Mark 71 and predetermined information 72a will be described later.

It is to be noted that what is displayed by display area 72 is not limited to predetermined information 72a shown by FIG. 1. For example, display area 70 may instead, or in addition, display predetermined information 72b shown by FIG. 2.

Figure 2:
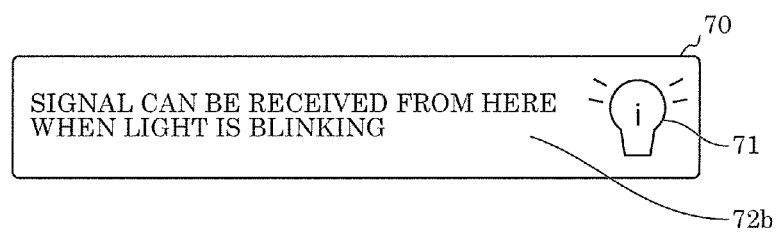
FIG. 2 is a diagram illustrating a display example of a display area according to the embodiment.

FIG. 2 is a diagram illustrating a display example of display area 70.

As illustrated in FIG. 2, predetermined information 72b is characters written in advance as, for example, "SIGNAL CAN BE RECEIVED FROM HERE WHEN LIGHT IS BLINKING" in display area 70 using, for example, fluorescent paint. It is to be noted that predetermined information 72b may be an image projected by first light source 30 or second light source 50.

First screen 20 may not include display area 70. In this case, guide display device 10 further includes a second screen which is provided between first screen 20 and cover 40 separately from first screen 20 and overlaps with area 41. In this regard, however, first light source 30 may illuminate the second screen. Moreover, in this case, the second screen displays mark 71 and predetermined information 72a or 72b.

First light source 30 and second light source 50 each are a light-emitting diode (light-emitting diodes) or a fluorescent light (fluorescent lights), for example. First light source 30 illuminates first screen 20. As mentioned above, guide display device 10 is the information board having the internal lighting system, for example, and first light source 30 illuminates entire first screen 20 from the back side of first screen 20 to highlight guide information 21 and make guide information 21 more visible at night. In order to highlight guide information 21 and make guide information 21 more visible at night, first light source 30 always remains on, for example. It is to be noted that first light source 30 need not illuminate display area 70 in first screen 20. Second light source 50 illuminates area 41 (display area 70) from above, and the light outputted by second light source 50 is reflected off area 41 as stated above. Although second light source 50 may illuminate the area other than area 41 (display area 70) as stated above, second light source 50 need not highlight guide information 21 and make guide information 21 more visible at night.

At least second light source 50 transmits identification information through optical communication by being controlled by controller 60 (FIG. 3) to be described later. It is to be noted that first light source 30 also transmits identification information through optical communication by being controlled by controller 60. First light source 30 and second light source 50 output light including the same identification information, for example. Identification information is unique to guide display device 10, and is information (ID)

indicating an installation location (e.g., latitude and longitude) of guide display device 10. The identification information includes numbers, for example. The identification information is transmitted from first screen 20 by the light outputted by first light source 30 passing through first screen 20. In addition, the identification information is transmitted from display area 70 by the light outputted by second light source 50 being reflected off display area 70.

[Configuration of Guide System]

Next, a configuration of guide system 1 will be described with reference to FIG. 3.

FIG. 3 is a block diagram illustrating an example of guide system 1.

Guide system 1 includes guide display device 10, mobile terminal 100, and server 200, and is a system for providing a guide service which allows a user to check a route from a present location to a destination. Operations of guide system 1 will be described in detail with reference to FIGS. 5 to 8 below. When the user gets lost outdoors or simply desires more detailed route information, the user can check a route from a present location (installation location of guide display device 10) to a destination by capturing guide display device 10 with mobile terminal 100.

Guide display device 10 includes first screen 20, first light source 30, cover 40, second light source 50, controller 60, display area 70, illumination sensor 80, and motion sensor 90. First screen 20, first light source 30, cover 40, second light source 50, and display area 70 have been described with reference to FIG. 1, and thus their description is omitted. Controller 60 is a functional and structural component of guide display device 10.

Controller 60 causes at least second light source 50 to perform optical communication. Controller 60 further causes first light source 30 to perform the optical communication. Controller 60 causes first light source 30 and second light source 50 to output light modulated with a modulation frequency which causes no flicker, to perform the optical communication (visible light communication), for example. Here, the light outputted by first light source 30 and the light outputted by second light source 50 are sometimes mixed, and thus controller 60 causes first light source 30 and second light source 50 to perform the optical communication in synchronization with each other. Moreover, controller 60 causes second light source 50 to blink when illuminating area 41. The blinking is at a rate perceivable to human eyes. Furthermore, controller 60 controls second light source 50 depending on detection results of illumination sensor 80 and motion sensor 90 to be described later. Although controller 60 is implemented as, for example, a processor which executes a control program stored in a storage (not shown) included in guide display device 10, controller 60 may be implemented as, for example, a microcomputer or a dedicated communication circuit.

Illumination sensor 80 detects illuminance of first screen 20 and includes a photodiode, for example. In a case where the illuminance detected by illumination sensor 80 is greater than or equal to a predetermined value, controller 60 turns on second light source 50. Moreover, in a case where the illuminance detected by illumination sensor 80 is less than the predetermined value, controller 60 turns off second light source 50. The predetermined value is illuminance of first screen 20 when mobile terminal 100 cannot correctly capture (receive) identification information because the identification information transmitted from first screen 20 is influenced by light such as sunlight. In other words, the illuminance of first screen 20 is likely to be greater than or equal to the predetermined value when strong light such as sunlight directly illuminates first screen 20.

Motion sensor 90 detects a person in front of first screen 20 and uses infrared, for example. In a case where motion sensor 90 detects a person, controller 60 turns on second light source 50. Moreover, in a case where motion sensor 90 does not detect a person, controller 60 turns off second light source 50.

Mobile terminal 100 is a mobile phone, a smartphone, or a tablet carried by a user when going out. Mobile terminal 100 communicates with server 200. Mobile terminal 100 includes controller 110, communicator 120, capturer 130, receiver 140, and display 150.

Controller 110 performs processing for display 150 to display a route from a present location to a destination. Controller 110 is implemented as, for example, a processor which executes a control program (application) stored in a storage (not shown) included in mobile terminal 100. Operations of controller 110 will be described in detail with reference to FIGS. 5 to 8 below.

Communicator 120 is a communication interface for communicating with server 200. Communications standards used in mobile telecommunications technology such as the third generation of wireless mobile telecommunications technology (3G), the fourth generation of wireless mobile telecommunications technology (4G), and LTE (registered trademark) are applied to communication between communicator 120 and server 200.

Capturer 130 is, for example, a camera which captures (receives) identification information transmitted from first screen 20 or display area 70 included in guide display device 10. The identification information captured by capturer 130 is transmitted to server 200 via communicator 120.

Receiver 140 is, for example, an operation part such as a switch, a button, and a keyboard, or a touch panel. The user operates receiver 140 to input a destination of the user. Information indicating the inputted destination is transmitted to server 200 via communicator 120.

Display 150 is, for example, a display (touch panel display) such as an LCD and an organic ELD. In a case where display 150 is a touch panel display, for example, the user operates a touch panel (receiver 140) to input a destination of the user. Display 150 displays an image shown by each of FIGS. 5, 6, and 8 to be described later.

Server 200 is a device which performs processing in response to a request from mobile terminal 100, and stores present location information in which identification information transmitted through the optical communication by first light source 30 or second light source 50 is associated in advance with location information of guide display device 10. The present location information will be described in detail with reference to FIG. 7 below. Server 200 includes controller 210, communicator 220, and storage 230.

Controller 210 performs processing for checking identification information transmitted by mobile terminal 100 against present location information and generating route information indicating a route from a location indicated by location information corresponding to the identification information to a location indicated by information indicating a destination and transmitted by mobile terminal 100. Although controller 210 is implemented as, for example, a processor which executes a control program stored in storage 230, controller 210 may be implemented as, for example, a microcomputer or a dedicated communication circuit. Operations of controller 210 will be described in detail with reference to FIGS. 7 and 8 below.

Communicator 220 is a communication interface for communicating with mobile terminal 100 (communicator 120). The route information generated by controller 210 is transmitted to mobile terminal 100 via communicator 220.

Storage 230 is a semiconductor memory such as a read-only memory (ROM) in which programs and data are stored and a random-access memory which is used for storing data etc. at a time of program execution. The present location information is stored in storage 230.

(Operation of Guide Display Device)

Next, operations of guide display device 10 will be described with reference to FIG. 4.

Figure 4:
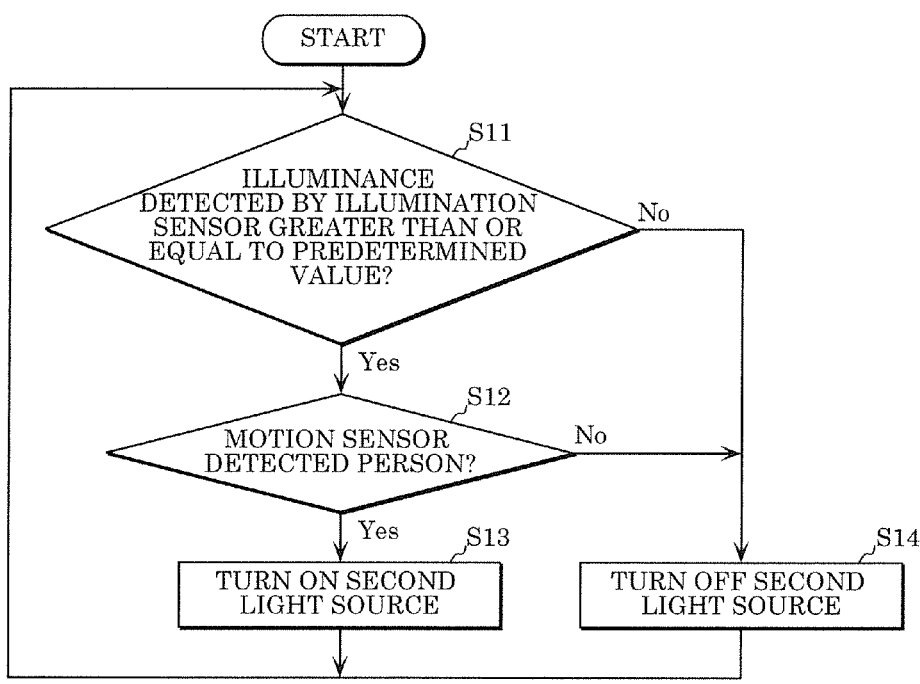
FIG. 4 is a flow chart illustrating exemplary operations of the guide display device according to the embodiment.

FIG. 4 is a flow chart illustrating exemplary operations of guide display device 10 according to the embodiment.

First, controller 60 determines whether illuminance of first screen 20 detected by illumination sensor 80 is greater than or equal to a predetermined value (step S11). With this, controller 60 determines whether strong light such as sunlight illuminates first screen 20. In a case where the illuminance of first screen 20 detected by illumination sensor 80 is greater than or equal to the predetermined value, mobile terminal 100 sometimes cannot correctly obtain identification information originating from first light source 30 due to the influence of the sunlight etc. even when first screen 20 is captured by mobile terminal 100.

In a case where controller 60 determines that the illuminance of first screen 20 detected by illumination sensor 80 is greater than or equal to the predetermined value (Yes in step S11), controller 60 determines whether motion sensor 90 detects a person in front of first screen 20 (step S12). With this, controller 60 determines whether a person who is trying to use guide display device 10 (e.g., check guide information 21 or obtain identification information) is in front of guide display device 10. In a case where motion sensor 90 detects a person in front of first screen 20, identification information may be obtained, and thus it is necessary to make the identification information available.

In a case where controller 60 determines that motion sensor 90 detects a person in front of first screen 20 (Yes in step S12), controller 60 turns on second light source 50 (step S13). With this, although mobile terminal 100 sometimes cannot correctly obtain the identification information originating from first light source 30 due to the influence of the sunlight etc. even when an area of first screen 20 directly illuminated with the sunlight etc. is captured by mobile terminal 100, mobile terminal 100 can obtain the identification information originating from second light source 50 by capturing display area 70 which cover 40 blocks from the direct sunlight etc. Guide display device 10 has a function to prompt the user to capture display area 70 with mobile terminal 100.

Display area 70 displays predetermined information 72a. As mentioned above, the characters "ANTI-SUNLIGHT DISPLAY AREA" are written as predetermined information 72a using, for example, fluorescent paint. With this, predetermined information 72a shining by receiving light outputted by second light source 50 can attract attention from the user. Accordingly, the user can recognize that display area 70 displaying predetermined information 72a is an area for which countermeasures against the sunlight are prepared and from which the identification information can be obtained.

Moreover, controller 60 causes second light source 50 to blink when illuminating area 41 (display area 70). With this, predetermined information 72a blinking by being illuminated with the blinking light outputted by second light source 50 can attract attention from the user while at the same time the blinking light includes the optically communicated identification information. It is to be noted that display area 70 may display predetermined information 72b. As mentioned above, the characters "SIGNAL CAN BE RECEIVED FROM HERE WHEN LIGHT IS BLINKING" are written as predetermined information 72b using, for example, fluorescent paint. With this, predetermined information 72b blinks by being illuminated with blinking light outputted by second light source 50. Accordingly, the user can recognize that display area 70 displaying predetermined information 72b is an area from which the identification information can be obtained.

In this way, guide display device 10 prompts the user to capture display area 70 with mobile terminal 100.

By contrast, in a case where controller 60 determines that the illuminance of first screen 20 detected by illumination sensor 80 is less than the predetermined value (No in step S11), controller 60 turns off second light source 50 (step S14). In this case, since first screen 20 is not illuminated with the strong light such as the sunlight, mobile terminal 100 can correctly obtain the identification information with no influence of the sunlight etc. by capturing first screen 20.

Moreover, in a case where controller 60 determines that motion sensor 90 does not detect a person in front of first screen 20 (No in step S12), controller 60 turns off second light source 50 (step S14). In this case, since no person is in front of guide display device 10 and the identification information is less likely to be obtained, the identification information may not be made obtainable from display area 70.

It is to be noted that order of step S11 and step S12 shown by FIG. 4 is an example, and step S12 may precede step S11.

Moreover, after controller 60 turns on second light source 50 in step S13, controller 60 may leave second light source 50 on for a predetermined time (e.g., one minute) regardless of determination in step S11 or step S12.

As stated above, controller 60 turns on second light source 50 when the illuminance of first screen 20 is greater than or equal to the predetermined value and the person is in front of first screen 20.

[Operation of Guide System]

Next, operations of guide system 1 will be described with reference to FIGS. 5 to 8.

Figure 5:
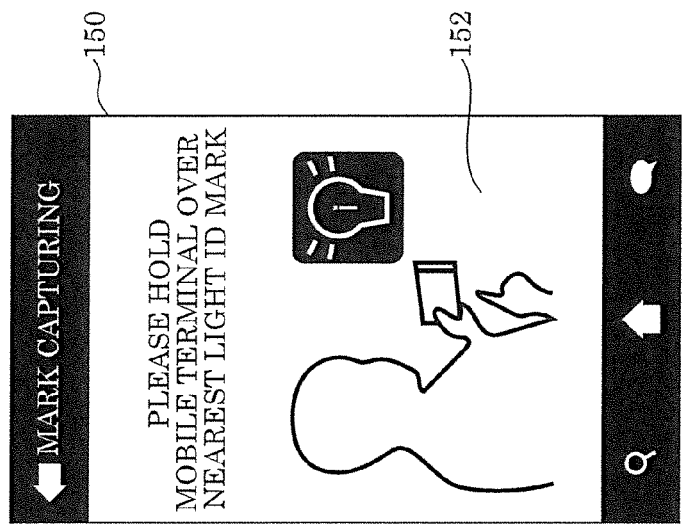
FIG. 5 is a schematic diagram illustrating an operation of the guide system according to the embodiment.
Figure 6:
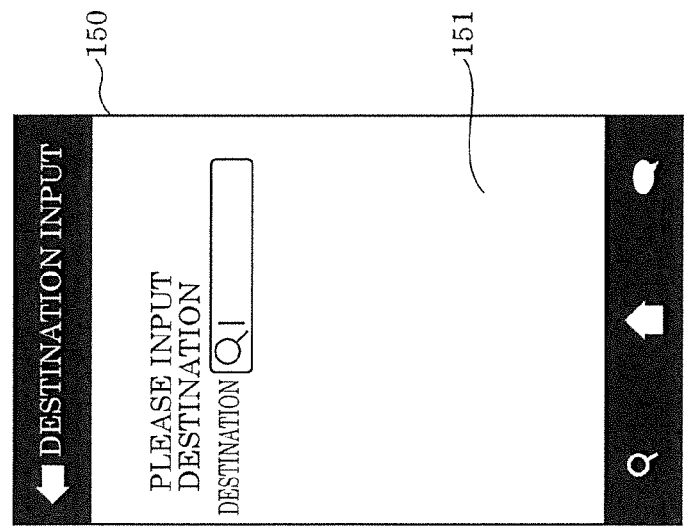
FIG. 6 is a schematic diagram illustrating an operation of the guide system according to the embodiment.
Figures 7, 8:
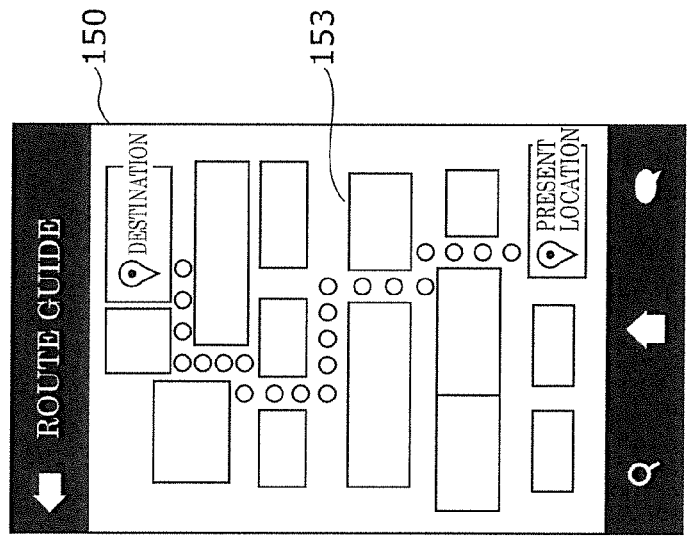
FIG. 7 is a table illustrating exemplary present location information stored in a server according to the embodiment.
FIG. 8 is a schematic diagram illustrating an operation of the guide system according to the embodiment.

FIGS. 5, 6, and 8 are schematic diagrams for illustrating the operations of guide system 1.

FIG. 5 shows content 151 which is displayed on display 150 of mobile terminal 100 for prompting a user to input a destination.

For example, it is assumed that installed in mobile terminal 100 is a program (application) which receives a guide service for checking on display 150 a route from a present location to a destination. Launching the application causes display 150 to display content 151 shown by FIG. 5, for example. Inputting a destination such as a public toilet and a bank displayed by first screen 20 via receiver 140 allows mobile terminal 100 to obtain information indicating the destination. The information indicating the destination is, for example, information indicating latitude and longitude.

In a case where the destination is inputted, display 150 displays content 152 shown by FIG. 6. Content 152 prompts the user to direct capturer 130 (camera) of mobile terminal 100 to mark 71 displayed in display area 70 of guide display device 10. With this, mobile terminal 100 obtains identification information transmitted by first light source 30 or second light source 50 through the optical communication, by capturer 130 capturing mark 71.

Mobile terminal 100 transmits, to communicator 220 of server 200 via communicator 120, the information indicating the destination and the identification information obtained by capturer 130 of mobile terminal 100.

Present location information as shown by FIG. 7 is stored in storage 230 of server 200.

FIG. 7 is a table illustrating exemplary present location information stored in server 200 according to the embodiment.

The present location information is information (e.g., table) in which identification information transmitted by first light source 30 or second light source 50 through the optical communication is associated in advance with location information of guide display device 10. Guide display devices 10 are installed in various places and have different identification information items in accordance with the installed places. As illustrated in FIG. 7, in the present location information, the identification information items of guide display devices 10 installed in the different places are associated with information items (e.g., information items each indicating latitude and longitude) about locations where guide display devices 10 are installed.

Server 200 (controller 210) checks the identification information transmitted by mobile terminal 100 against the present location information, and generates route information indicating a route from a location indicated by location information corresponding to the identification information to a location indicated by the information indicating the destination and transmitted by mobile terminal 100. For example, in a case where identification information transmitted by mobile terminal 100 is "111," controller 210 generates route information indicating a route from latitude and longitude "34.6863, 135.5197" indicated by location information corresponding to "111" to latitude and longitude indicated by information indicating a destination. Server 200 (controller 210) transmits the route information to communicator 120 of mobile terminal 100 via communicator 220.

When mobile terminal 100 receives the route information from server 200, display 150 displays content 153 shown by FIG. 8, based on the route information. Content 153 is, for example, a map on which the present location, the destination, and the route from the present location to the destination are superimposed. With this, the user can check the route from the present location, the location where captured guide display device 10 is installed, to the destination.

As stated above, guide system 1 provides the guide service with which the user can check the route from the present location to the destination.

Advantageous Effects Etc.

Conventionally, when, for example, a guide display device is installed outdoors, a screen of the guide display device is sometimes illuminated with strong light such as sunlight. In this case, a mobile terminal sometimes cannot receive a guide service because the mobile terminal cannot correctly receive identification information transmitted from the screen due to the influence of the sunlight.

In view of this, guide display device 10 according to the embodiment is a guide display device which is installed in a substantially vertical direction. Guide display device 10 includes: first screen 20 which is parallel to the substantially vertical direction; first light source 30 which illuminates first screen 20; cover 40 which is provided above first screen 20 in the substantially vertical direction and projects in a direction crossing first screen 20; second light source which illuminates area 41 on which a shadow of cover 40 blocking light from above guide display device 10 is cast; and controller 60 which causes at least second light source 50 to perform optical communication.

With this, when guide display device 10 receives strong light such as sunlight, area 41 on which a shadow of cover 40 blocking the strong light such as the sunlight is cast appears in guide display device 10. As a result, in area 41 illuminated by second light source 50, the optical communication performed by second light source 50 when, for example, the light of second light source 50 is reflected off area 41 is less subject to the light such as the sunlight. Thus, the optical communication can be correctly performed.

Moreover, first screen includes display area 70 overlapping with area 41 in an upper part of first screen 20, and display area 70 displays predetermined information 72a or 72b.

Alternatively, guide display device 10 further includes a second screen which is provided between first screen 20 and cover 40 separately from first screen 20 and overlaps with area 41, and the second screen displays predetermined information 72a or 72b.

Display area 70 or the second screen displays, as predetermined information 72a or 72b, content which, for example, makes it clear that display area 70 or the second screen is an area which allows the optical communication to be correctly performed. With this, a user can easily understand that display area 70 or the second screen displaying predetermined information 72a or 72b is the area which allows the optical communication to be correctly performed.

Furthermore, controller 60 causes second light source 50 to blink when illuminating area 41.

With this, area 41 which the light outputted by second light source 50 blinking is reflected off also blinks, and thus it is possible to attract attention from the user. Accordingly, it is possible to prompt the user to perform the optical communication in area 41 which is less subject to the light such as the sunlight.

Moreover, controller 60 further causes first light source 30 to perform the optical communication.

With this, first light source 30 can illuminate first screen 20 to highlight first screen 20, for example, and at the same time can perform the optical communication. In addition, even in a case where second light source 50 is turned off if second light source 50 does not need to perform the optical communication, first light source 30 can perform the optical communication.

Furthermore, controller 60 causes first light source 30 and second light source 50 to perform the optical communication in synchronization with each other.

With this, even in a case where light outputted by first light source 30 and light outputted by second light source 50 are mixed, it is possible to correctly perform the optical communication.

Moreover, guide display device 10 further includes illumination sensor 80 which detects illuminance of first screen 20, wherein in a case where the illuminance detected by illumination sensor 80 is greater than or equal to a predetermined value, controller 60 turns on second light source 50, and in a case where the illuminance detected by illumination sensor 80 is less than the predetermined value, controller 60 turns off second light source 50.

With this, in a case where the illuminance detected by illumination sensor 80 is less than, as a predetermined value, illuminance with which, for example, the optical communication performed by first light source 30 is subject to the light such as the sunlight, the strong light such as the sunlight does not directly illuminate first screen 20. Accordingly, controller 60 causes first light source 30 to correctly perform the optical communication. In other words, in a case where the illuminance detected by illumination sensor 80 is less than the predetermined value, first light source 30 can correctly perform the optical communication without causing second light source 50 to perform the optical communication. Accordingly, second light source 50 can be turned off, and guide display device 10 can achieve power savings.

In addition, guide display device 10 further includes motion sensor 90 which detects a person in front of first screen 20, wherein in a case where motion sensor 90 detects the person, controller 60 turns on second light source 50, and in a case where motion sensor 90 does not detect the person, controller 60 turns off second light source 50.

With this, in a case where motion sensor 90 does not detect a person in front of first screen 20, no person is in front of guide display device 10, and it is not necessary to perform the optical communication. Consequently, second light source 50 can be turned off, and guide display device 10 can achieve the power savings.

Guide system 1 according to the embodiment includes: guide display device 10 described above; server 200 which stores present location information in which identification information transmitted by either one of first light source 30 and second light source 50 through the optical communication is associated in advance with location information of guide display device 10; and mobile terminal 100 which communicates with server 200. Mobile terminal 100 transmits, to server 200, information indicating a destination and the identification information obtained by capturer 130 included in mobile terminal 100. Server 200 checks the identification information transmitted by mobile terminal 100 against the present location information, generates route information indicating a route from a location indicated by location information corresponding to the identification information to a location indicated by the information indicating the destination and transmitted by mobile terminal 100, and transmits the route information to mobile terminal 100.

With this, when guide display device 10 receives strong light such as sunlight, area 41 on which a shadow of cover 40 blocking the strong light such as the sunlight is cast appears in guide display device 10. As a result, in area 41 illuminated by second light source 50, the optical communication performed by second light source 50 when, for example, the light of second light source 50 is reflected off area 41 is less subject to the light such as the sunlight. Thus, the optical communication can be correctly performed. Thus, it is possible to receive a guide service which allows mobile terminal 100 to check the route from the present location (installation location of guide display device 10) to the destination.

Other Embodiments

Although guide display device 10 and guide system 1 according to the embodiment have been described above, the present disclosure is not limited to the aforementioned embodiment.

For example, although guide display device 10 is installed in an outdoor location receiving the sunlight in the aforementioned embodiment, the present disclosure is not limited to this. For example, guide display device 10 may be installed in an indoor location not receiving the sunlight. In this case, although guide display device 10 may receive strong light from a luminaire installed in the indoor location, guide display device 10 can correctly perform the optical communication because cover 40 blocks the light.

Moreover, for example, although controller 60 causes first light source 30 to perform the optical communication in the aforementioned embodiment, the present disclosure is not limited to this. For example, controller 60 may not cause first light source 30 to perform the optical communication. In this regard, however, even in a case where illuminance detected by illumination sensor 80 is less than a predetermined value, controller 60 may not turn off second light source 50.

Furthermore, for example, although second light source 50 illuminates display area 70 from above and the light outputted by second light source 50 is reflected off display area 70 in the aforementioned embodiment, the present disclosure is not limited to this. For example, second light source 50 may be disposed on a back side of display area 70. In this case, predetermined information 72a or 72b need not be written using fluorescent paint.

Moreover, for example, although first light source 30 always remains on in the aforementioned embodiment, the present disclosure is not limited to this. For example, first light source 30 may be turned off in a bright time period such as the daytime.

Furthermore, for example, although controller 60 causes first light source 30 and second light source 50 to perform the optical communication in synchronization with each other in the aforementioned embodiment, the present disclosure is not limited to this. For example, controller 60 may not cause first light source 30 and second light source 50 to perform the optical communication in synchronization with each other. In this regard, however, positions and orientations of first light source 30 and second light source 50 may be adjusted to prevent light outputted by first light source 30 and light outputted by second light source from being mixed. In addition, in this case, information transmitted by first light source 30 may be different from information transmitted by second light source 50.

Moreover, for example, although guide display device 10 includes display area 70 or the second screen in the aforementioned embodiment, the present disclosure is not limited to this. For example, guide display device 10 may not include display area 70 or the second screen. To put it differently, predetermined information 72a or 72b may not be displayed.

Furthermore, for example, although guide display device 10 includes illumination sensor 80 and motion sensor 90 in the aforementioned embodiment, the present disclosure is not limited to this. For example, guide display device 10 may not include at least one of illumination sensor 80 and motion sensor 90.

Moreover, for example, although controller 60 causes second light source 50 to blink when illuminating area 41 in the aforementioned embodiment, second light source 50 may not be caused to blink.

Furthermore, the present disclosure is implemented not only as guide display device 10 but also as a method including steps (processes) performed by controller 60 included in guide display device 10.

For example, these steps may be executed by a computer (computer system). The present disclosure may be implemented as a program which causes the computer to execute the steps included in the method. In addition, the present disclosure may be implemented as a non-transitory computer-readable recording medium on which the program is recorded, such as a CD-ROM.

For example, in a case where the present disclosure is implemented as a program (software), each step is performed by executing the program using hardware resources such as a CPU, a memory, and an input output circuit of a computer. Specifically, each step is performed by the CPU obtaining data from, for example, the memory or the input output circuit and calculating the data, and outputting the results of the calculation to, for example, the memory or the input output circuit.

Moreover, controller 60 included in guide display device 10 according to the aforementioned embodiment may be implemented as a dedicated communication circuit or a general-purpose circuit.

Furthermore, controller 60 included in guide display device 10 according to the aforementioned embodiment may be implemented as a large-scale integration (LSI) circuit which is an integrated circuit (IC).

Moreover, the integrated circuit is not limited to an LSI, and may be implemented as a dedicated communication circuit or a general-purpose processor. A Field Programmable Gate Array (FPGA) which is programmable after manufacturing the LSI or a reconfigurable processor which allows reconfiguration of the connections and settings of circuit cells inside the LSI may be used.

In addition, if circuit integration technology that replaces LSI appears through advancement of semiconductor technology or other derived technology, that technology can naturally be used to carry out circuit integration of controller 60 included in guide display device 10.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A guide display device installed in a predetermined direction, comprising:
    a first screen which is parallel to the predetermined direction;
    a first light source which illuminates the first screen;
    a cover which is provided above the first screen in the predetermined direction and projects in a direction crossing the first screen to block light from above the guide display device and cast a shadow upon an area of the guide display device;
    a second light source which illuminates the area on which the shadow is cast; and
    a controller which causes at least the second light source to perform optical communication.

2. The guide display device according to claim 1,
    wherein the first screen includes a display area overlapping with the area in an upper part of the first screen, and
    the display area displays predetermined information.

3. The guide display device according to claim 1, further comprising
    a second screen which is provided between the first screen and the cover separately from the first screen and overlaps with the area,
    wherein the second screen displays predetermined information.

4. The guide display device according to claim 1,
    wherein the controller causes the second light source to blink when illuminating the area.

5. The guide display device according to claim 1,
    wherein the controller causes the first light source and the second light source to perform optical communication.

6. The guide display device according to claim 5,
    wherein the controller causes the first light source and the second light source to perform optical communication in synchronization with each other.

7. The guide display device according to claim 5, further comprising
    an illumination sensor which detects illuminance of the first screen,
    wherein in a case where the illuminance detected by the illumination sensor is greater than or equal to a predetermined value, the controller turns on the second light source, and in a case where the illuminance detected by the illumination sensor is less than the predetermined value, the controller turns off the second light source.

8. The guide display device according to claim 5, further comprising
    a motion sensor which detects a person in front of the first screen,
    wherein in a case where the motion sensor detects the person, the controller turns on the second light source, and in a case where the motion sensor does not detect the person, the controller turns off the second light source.

9. A guide system comprising:
    the guide display device according to claim 1;
    a server which stores present location information in which identification information transmitted by at least one of the first light source and the second light source through optical communication is associated in advance with location information of the guide display device; and
    a mobile terminal which communicates with the server,
    wherein the mobile terminal transmits, to the server, information indicating a destination, and the identification information obtained by a capture included in the mobile terminal, and
    the server checks the identification information transmitted by the mobile terminal against the present location information, generates route information indicating a route from a location indicated by location information corresponding to the identification information to a location indicated by the information indicating the destination and transmitted by the mobile terminal, and transmits the route information to the mobile terminal.

10. A method of utilizing a guide display device installed in a predetermined direction to communicate information optically, comprising:
    illuminating a first screen which is parallel to the predetermined direction with a first light source;
    providing a cover above the first screen in the predetermined direction and projecting in a direction crossing the first screen to block light from above the guide display device and cast a shadow upon an area of the guide display device;
    illuminating the area on which the shadow is cast with a second light source; and
    causing at least the second light source to perform optical communication.

11. The method according to claim 10,
    wherein the first light source and the second light source perform optical communication; and
    wherein in a case where illuminance of the guide display device is greater than or equal to a predetermined value, turning on the second light source, and in a case where the illuminance is less than the predetermined value, turning off the second light source.

12. A method for acquiring information from a guide display device installed in a predetermined direction, the guide display device including: a first screen which is parallel to the predetermined direction; a first light source which illuminates the first screen; a cover which is provided above the first screen in the predetermined direction and projects in a direction crossing the first screen to block light from above the guide display device and cast a shadow upon an area of the guide display device; and a second light source which illuminates the area on which the shadow is cast, both the first light source and the second light source being configured to perform optical communication, the method comprising:

in a case where illuminance of the guide display device is greater than or equal to a predetermined value, capturing optical information from the second light source alone or in combination with the first light source; and in a case where illuminance of the guide display is less than or equal to a predetermined value, capturing optical information from only the first light source.

13. A program stored on a non-transitory, machine-readable medium which, when executed by a controller in a mobile terminal, causes the mobile terminal to:

prompt a user to input destination information;

prompt a user to capture an area on a guide display device, the area being where a cover provided above a first screen included in the guide display device blocks light from above the guide display device to cast a shadow upon the area, and the area being lit by a light source performing optical communication;

obtain identification information identifying the guide display device from optical communication obtained from the captured area;

communicate the destination information and the identification information to a server;

receive route information from the server indicating a route from a location indicated by location information corresponding to the identification information to a location indicated by the destination information communicated to the server; and display the route.

* * * * *